(12) United States Patent
Underhill (10) Patent No.: US 6,170,246 B1
(45) Date of Patent: Jan. 9, 2001

(54) ROUND BALER IDLER ROLL MOUNTING APPARATUS

(75) Inventor: Kenneth R. Underhill, Strasburg, PA (US)

(73) Assignee: New Holland North America, Inc., New Holland, PA (US)

( * ) Notice: Under 35 U.S.C. 154(b), the term of this patent shall be extended for 0 days.

(21) Appl. No.: 09/317,457

(22) Filed: May 24, 1999

(51) Int. Cl.⁷ .................................................. A01D 39/00
(52) U.S. Cl. ............................................................ 56/341
(58) Field of Search ....................... 56/341, 343; 100/88, 100/89

(56) References Cited

U.S. PATENT DOCUMENTS

| | | | |
|---|---|---|---|
| 4,409,783 | * 10/1983 | Gaeddert | 56/341 |
| 4,870,812 | 10/1989 | Jennings et al. | 56/341 |
| 4,910,947 | * 3/1990 | Seymour | 56/16.4 |
| 5,191,833 | * 3/1993 | Clevenger, Jr. | 56/341 |
| 5,205,105 | 4/1993 | Krone et al. | 53/118 |
| 5,347,801 | * 9/1994 | McIlwain | 56/341 |
| 5,444,969 | 8/1995 | Wagstaff et al. | 56/341 |
| 5,448,944 | * 9/1995 | Line et al. | 56/341 |
| 5,488,883 | * 2/1996 | McMillen et al. | 56/341 |

FOREIGN PATENT DOCUMENTS 2143469B  3/1986  (GB) .
9716959   5/1997  (WO) .

* cited by examiner

Primary Examiner—Robert E. Pezzuto
Assistant Examiner—Nathan Mammen
(74) Attorney, Agent, or Firm—J. William Stader; Larry W. Miller (57) ABSTRACT

A round baler for forming crop material into cylindrical bales. The baler has a main frame, a pair of side walls, a crop pickup mounted on the main frame, and a tailgate pivotally connected to the main frame. The tailgate is operative between a closed position during which a bale is being formed in an expandable chamber, and an open position during which a formed bale is being discharged from the chamber. A sledge assembly, pivotally mounted on the main frame for movement between a bale starting position and a full bale position, has crop engaging transverse rollers for urging the crop material along a spiral path in the chamber for starting and forming a bale. A apron is supported along a continuous path on the main frame and tailgate by a plurality of rotatable guide members. The path has an inner course that cooperates with the sledge rolls on the sledge assembly to define moveable walls of the chamber. A drive roll moves the apron along the continuous path. A take up assembly moves with the sledge assembly between the bale starting position and full bale position to provide slack in the apron under conditions where the tailgate is moved from its closed position to its open position.

8 Claims, 8 Drawing Sheets

PRIOR ART

ROUND BALER IDLER ROLL MOUNTING APPARATUS

FIELD OF THE INVENTION

The present invention relates to agricultural apparatus for forming and wrapping cylindrical packages of crop material, generally referred to as round balers, and more particularly to a round baler having one or more transverse idler rolls.

BACKGROUND OF THE INVENTION

Round balers generally have a bale forming chamber defined by a pair of opposing side walls associated with an array of side-by-side belts, transverse slats trained on chains, a plurality of transverse rolls or a combination of these various elements, e.g., rolls and belts. During field operation, windrowed crop material such as hay is picked up from the ground and fed in a continuous stream into a fixed or variable diameter chamber. The hay is rolled into a cylindrical package within the chamber, wrapped with twine, net or the like and ejected onto the ground for subsequent handling.

U.S. Pat. No. 5,444,969, issued Aug. 29, 1995 in the name of Robert A. Wagstaff, et al, discloses a prior art round baler of the general nature described above. In this particular type of baler an expandable chamber is defined by a pair of fixed sidewalls, and a plurality of side-by-side belts cooperating with a series of transverse rolls, mounted between a pair of pivotally mounted arms. This arrangement of rolls and arms is commonly referred to as a sledge assembly. In the vicinity of the chamber where the belts and rolls operate in close proximity the transverse roll closest to the belts strips material from the adjacent belts that are trained about what is referred to as a follower roll. This is a common expedient in prior art balers having a chamber defined by rolls and belts.

The chamber includes an inlet opening in the front through which crop material is fed. Also included is a pair of take up arms pivotally mounted on the main frame, between which arms a pair of guide rolls are journalled. A biasing force on the take up arms urges the outer surfaces of the guide rolls against the belts to maintain tension and thereby prevent slack from occurring in the belts during expansion and contraction of the chamber. Density of the bale can be affected by varying the force on the take up arms.

The preferred embodiment of the present invention relates to an improved round baler in which a cylindrical package of crop material is formed in a chamber comprising fixed side walls and expandable transverse elements consisting of a combination of belts and rolls of the general nature described in the preceding paragraph. The '969 patent, cited above, is an example of many prior art patents, assigned to New Holland North America, Inc., that disclose this type of round baler. It is not uncommon in prior art round balers having this general configuration for the tubular idler rolls that support the belts to experience significant amounts of radial force that may cause the supporting walls to deflect slightly in the area of the walls adjacent the mounting assemblies. This type of deflection or buckling is commonly referred to as "oil canning", an example of which is illustrated at FIG. 5 of the drawings.

Figure 5:
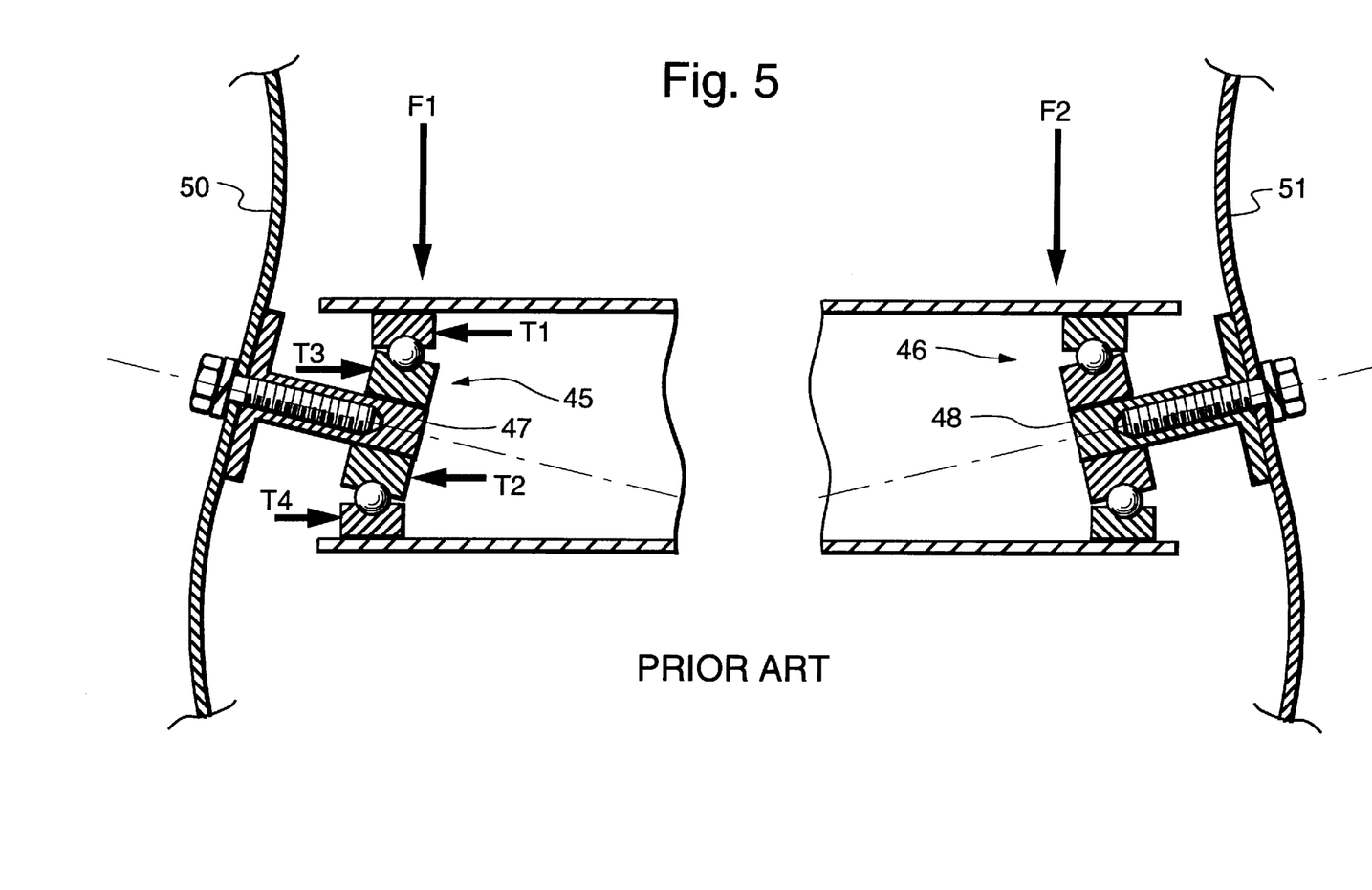
FIG. 5 is a cross sectional illustration of a prior art idler roll mounting system.

This oil canning problem, which has been encountered in various types of prior art stub shaft mounting assemblies, creates uneven transverse loading on the bearings, as illustrated by the force arrows in FIG. 5, resulting in premature bearing failure. To overcome this oil canning effect, tubular idler rolls have been mounted on solid shafts. The expedient of a solid shaft on which a tubular roll is mounted in well known in the prior art. Examples of this are shown in PCT Publication No. WO 97/16959, filed Oct. 15, 1997, and published May 15, 1997 in the name of John Dale Anderson, et al, and U.S. Pat. No. 5,205,105, issued Apr. 27, 1993 in the name of Bernard Krone, et al. In Anderson, et al, the arrangement is disclosed in a round baler idler shaft, while in Krone, et al, a floor roll for a round baler is depicted.

In the aforementioned prior art idler roll mounting systems employing a solid shaft, the Anderson, et al assembly includes a locking collar arrangement at one end of the shaft to secure it in a D-shaped holding disc, while in Krone, et al, the solid shaft 58 for a tubular floor roll is shown extending through both side walls, e.g., see FIG. 4 of Krone, et al.

The present invention is directed to an improved idler roll mounting assembly that overcomes the oil canning problem and is conducive to simple and inexpensive fabrication while also having the advantage of being readily serviceable. Although the invention is particularly adaptable to a round baler in which a cylindrical package of crop material is formed between expandable walls consisting of a combination of belts and rolls of the general nature described in the '969 patent, cited above, it is not limited to a specific round baler configuration. The '969 patent is merely cited as an example of the numerous prior art patents that disclose this type of round baler, referred to by some as a roll belt round baler, by virtue of the rolls and belts that define the bale forming chamber.

Unique structural characteristics of the present invention, described below, contribute to a round baler idler roll mounting system that provides for many implicit and explicit advantages over known prior art systems that will become apparent from the following description. Among other things, the invention enhances performance, simplifies construction and improves durability of round balers, regardless of the nature of the design, i.e., roll belt balers, roll balers, belt balers, etc. Additionally, there is a noted improvement in the serviceability of round balers incorporating the various embodiments of the mounting assembly of the present invention.

SUMMARY OF THE INVENTION

Accordingly, one object of the present invention is to provide an idler roll mounting assembly for a round baler that overcomes the above discussed problems.

Another object of the present invention is to provide a simple and low cost idler roll mounting assembly for a round baler.

Yet another object of the present invention is to provide an idler roll mounting assembly for a round baler that enhances performance and durability.

Still another object of the present invention is to provide an idler roll mounting assembly for a round baler that enhances serviceability.

A further object of the present invention is to provide in an idler roll mounting assembly for a round baler that is conducive to simplified baler fabrication.

In pursuance of these and other important objects the present invention contemplates improvements to a round baler for forming crop material into cylindrical bales. The baler comprises a main frame, a pair of opposing walls, conveying means including an apron defining a baling chamber between the walls for forming cylindrical bales of crop material, a pickup for feeding crop material into the chamber, a tubular rotatable transverse idler roll mounted between the opposing walls for operatively supporting the apron, and a mounting assembly having a bearing assembly for mounting the roll on one of the opposing walls, the bearing assembly including a generally cylindrical stationary first race and a concentrically disposed generally cylindrical rotatable second race between which races a bearing cavity is formed for seating a series of bearings housed between the first and second races. More particularly, the invention contemplates a shaft extending between the opposing walls, the shaft having a ribbed end portion, the first race attached to the shaft, the second race attached to the tubular rotatable transverse idler roll, a slot in the one of the opposing walls for accommodating the ribbed end portion of the shaft, and means for retaining the shaft in the slot.

The foregoing and other objects, features and advantages of the invention will appear more fully hereinafter from a consideration of the detailed description which follows, in conjunction with the accompanying sheets of drawings wherein one principal embodiment and other secondary embodiments of the invention are illustrated by way of example. It is to be expressly understood, however, that the drawings are for illustrative purposes and are not to be construed as defining the limits of the invention.

DESCRIPTION OF THE PREFERRED EMBODIMENT

Figure 1:
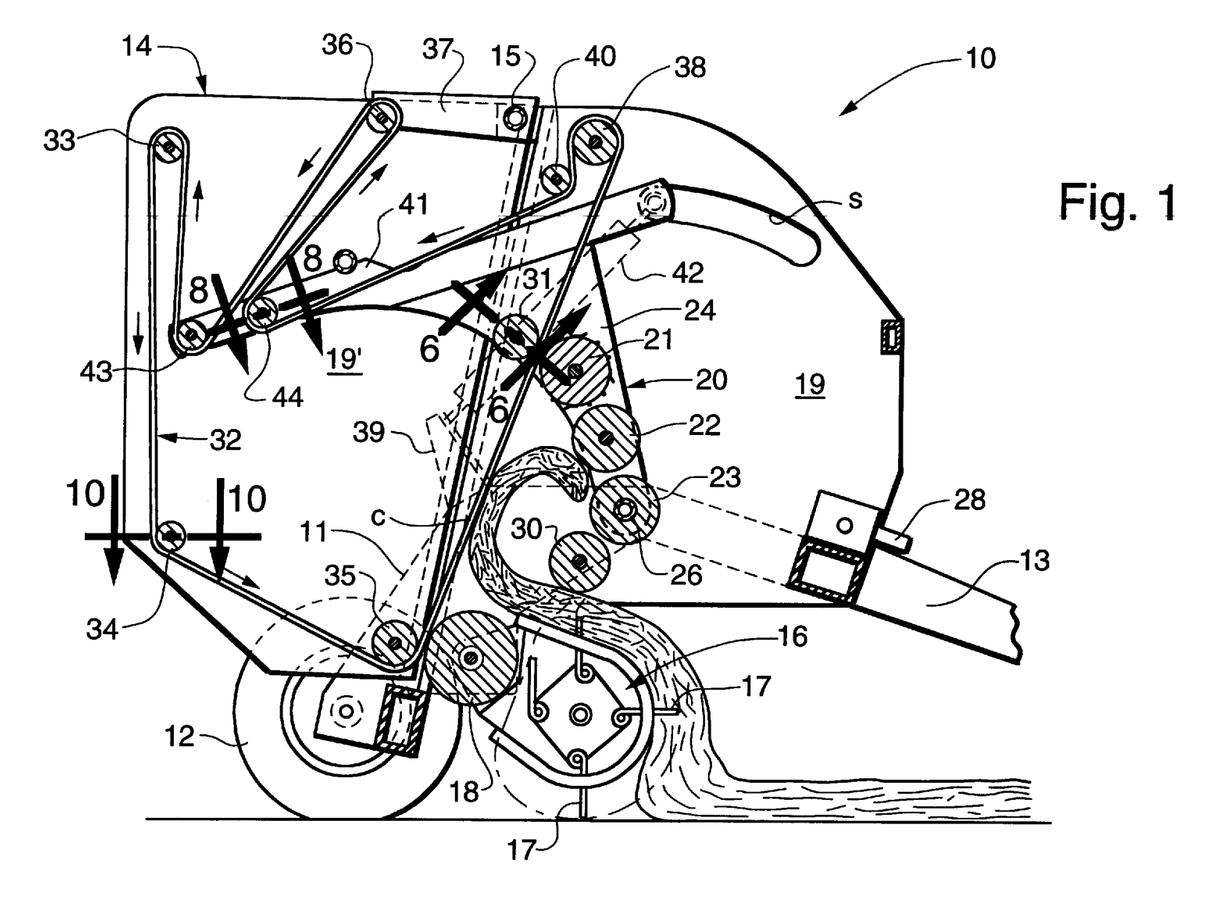
FIG. 1 is a cross sectional diagrammatic side elevational view of a round baler in which the present invention is incorporated. The tailgate is in the closed position and the elements of the bale forming chamber are shown in their core starting condition.

Referring to the drawings for a detailed description of the preferred embodiment of the invention, FIG. 1 shows the cross section of a round baler 10 of the type in which the present invention is readily embodied. Baler 10 has an expandable bale forming chamber defined in part by belts and rolls. This type of expandable chamber is disclosed in various prior art patents, e.g., U.S. Pat. No. 5,444,969 mentioned above, and earlier U.S. Pat. No. 4,870,812, issued Oct. 12, 1989 in the name of Richard E. Jennings, et al, both of which are hereby incorporated by reference. It should be noted that throughout this description the drawings are diagrammatic in nature to best show the elements of the baler in which the invention is embodied. To this end, in many instances only one element of a pair of elements is shown, especially in those cases where identical elements exist, disposed on opposing sides of the baler, e.g., wheels, side walls, etc.

Baler 10 has a main frame 11, comprising a plurality of rigid structural elements including a pair of side walls 19 (only one shown). Main frame 11 is supported by a pair of wheels 12 (also only one shown). A forwardly mounted tongue 13, integral with main frame 11, provides for connection to a tractor, in a conventional manner. Pivotally connected to side walls 19 by a pair of stub shafts 15 (only one shown) is a tailgate 14 which is closed during bale formation. Tailgate 14 includes walls 19' coplanar with side walls 19. A pickup 16, mounted on main frame 11, has a plurality of tines 17, the tips of which are movable along a predetermined path to lift crop material from the ground and deliver it rearwardly along a generally horizontal path toward a floor roll 18, rotatably mounted on main frame 11.

An expandable chamber for forming bales is defined by side walls 19', 19, belts, and a sledge assembly 20, operative between the inwardly facing surfaces of such walls. Sledge assembly 20 comprises a plurality of transversely extending rolls 21, 22, 23 journalled at their ends in a pair of spaced apart arms 24, one of which is shown. These arms are pivotally mounted on stub shafts 26 for providing movement of sledge assembly 20 from the bale starting position shown in FIG. 1 through the partly full position shown in FIG. 2 to the full bale position shown in FIG. 3, and finally to the bale discharge position shown in FIG. 4. Rolls 21, 22, 23 are driven in a counter-clockwise direction by conventional means (for example, chains and sprockets) coupled via an appropriate drive train to a drive shaft 28. A starter roll 30, located adjacent roll 23, is also driven counter-clockwise. Sledge assembly 20 includes a forth roll, a freely rotatable idler roll 31 carried between arms 24, commonly referred to as a follower roll.

The bale forming chamber is further defined by an apron 32 comprising a plurality of laterally spaced side-by-side belts supported by guide rolls 33, 34, 35, rotatably mounted in tailgate 14, and roll 36, rotatably mounted on stationary arms 37, affixed to main frame 11. Apron 32 is also supported on a drive roll 38, mounted on main frame 11. Although apron 32 passes between roll 21 and follower roll 31, it is in engagement only with follower roll 31 and not roll 21. In addition to its bale forming function, roll 21 also serves to strip crop material from the belts, and this is commonly referred to as a stripper roll.

Suitable coupling means (not shown) connected to drive shaft 28 provide for rotation of drive roll 38. This causes movement of apron 32 along its varying paths in the directions indicated by the arrows in FIGS. 1, 2 and 3. An additional guide roll 40 in the main frame 11 ensures proper driving engagement between the surfaces of the belts of apron 32 and the surface of drive roll 38.

A pair of take up arms 41 (only one shown), integral with sledge assembly 20, are affixed to sledge arms 24 for movement between inner, intermediate, outer and bale discharge positions shown in FIGS. 1, 2, 3 and 4, respectively. Take up arms 41, which carry additional guide rolls 43, 44 for supporting apron 32, are urged with sledge assembly 20 toward the innermost position (FIG. 1), i.e., bale starting position, by tension spring 42, mounted between one of arms 41 and main frame 11 by bracket assembly 39, affixed to main frame 11. Spring 42, mounted outwardly from wall 19, is pivotally secured to arm 41 by journal means extending through access slot s in side wall 19. While one function of spring 42 is to return the sledge and takeup assemblies to the start position after a bale is discharged, another equally as important function is to provide a force on sledge assembly 20 that resists expansive forces on the chamber.

When the elements of round baler 10 are disposed as shown in FIG. 1, an inner course c of apron 32 extends between guide roll 35 and idler roll 31 to form the rear wall of the core starting chamber while the inwardly facing peripheral surfaces of rolls 21, 22, 23 define in a general manner a rearwardly inclined cooperating front wall. Floor roll 18 defines the bottom of the chamber and with starter roller 30 provides an inlet for crop material.

Figure 2:
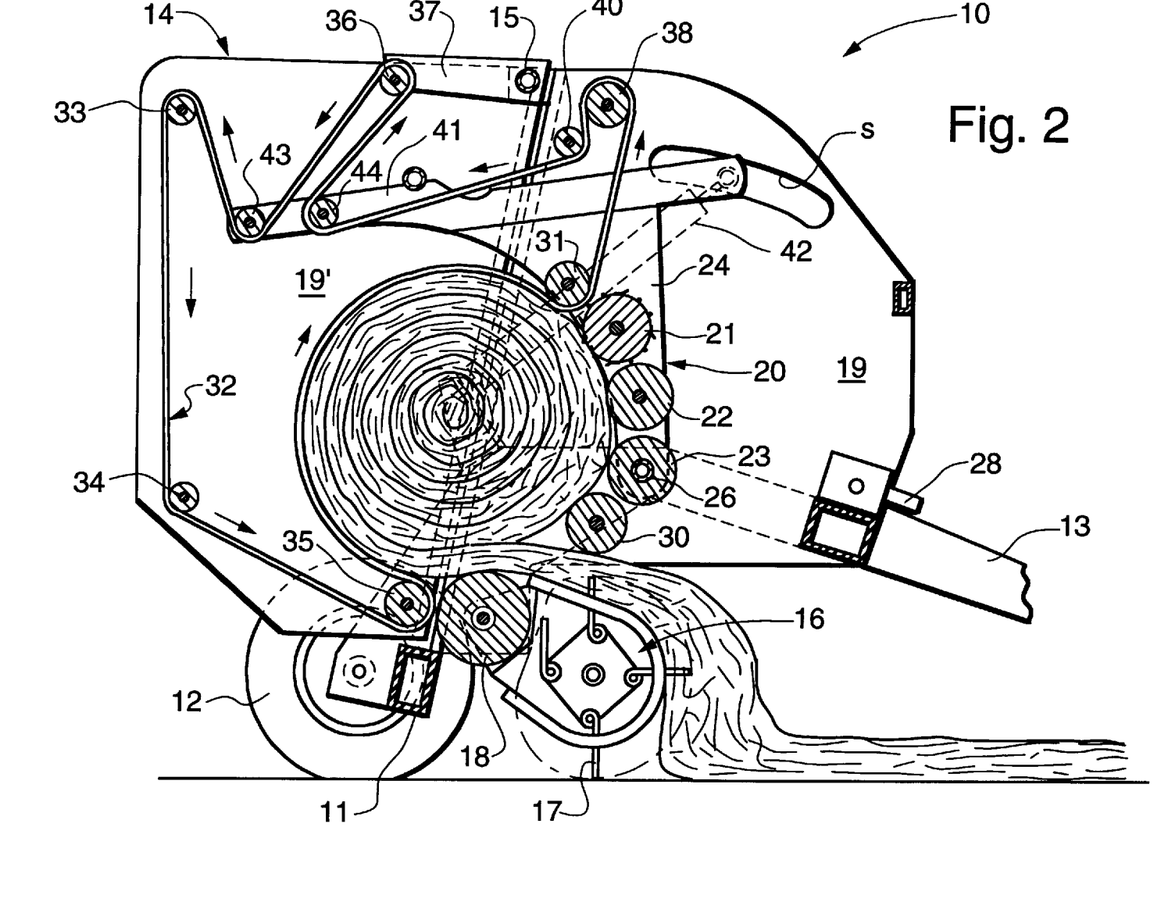
FIG. 2, generally similar to FIG. 1, is a cross sectional diagrammatic side elevational view of a round baler in which the tailgate is in the closed position and the elements of the bale forming chamber are shown in an intermediate bale forming condition.

When round baler 10 travels across a field, pickup tines 17 lift crop material from the ground and deliver it through the inlet. The crop material is carried rearwardly by floor roll 18 into engagement with apron inner course c (FIG. 1) which urges it upwardly and forwardly into engagement with the rolls on sledge 20. In this manner crop material is coiled in a clockwise direction to start a bale core. Continued feeding by pickup tines 17 of crop material into the bale forming chamber in a generally spiral fashion causes the apron inner course c to expand in length around a portion of the circumference of the cylindrical package of crop material as its diameter increases (FIG. 2). Take up arms 41 rotate with sledge assembly 20 about the coaxial horizontal axes of stub shafts 26 from their initial positions shown in FIG. 1 toward their outer positions shown in FIG. 3 to provide for expansion of the inner course of the apron in a manner similar to that of the prior art balers mentioned above, i.e., in effect the outer course of the belts of apron 32 is diminished in length while the inner course increases a like amount. After a cylindrical package of crop material has been formed in the fashion described and wrapped with twine or net in a well known manner to form a bale, tailgate 14 is opened and the bale is ejected rearwardly as shown in FIG. 4. Subsequent closing of tailgate 14 returns the inner and outer courses of the belts of apron 32 to the locations shown in FIG. 1.

Figure 3:
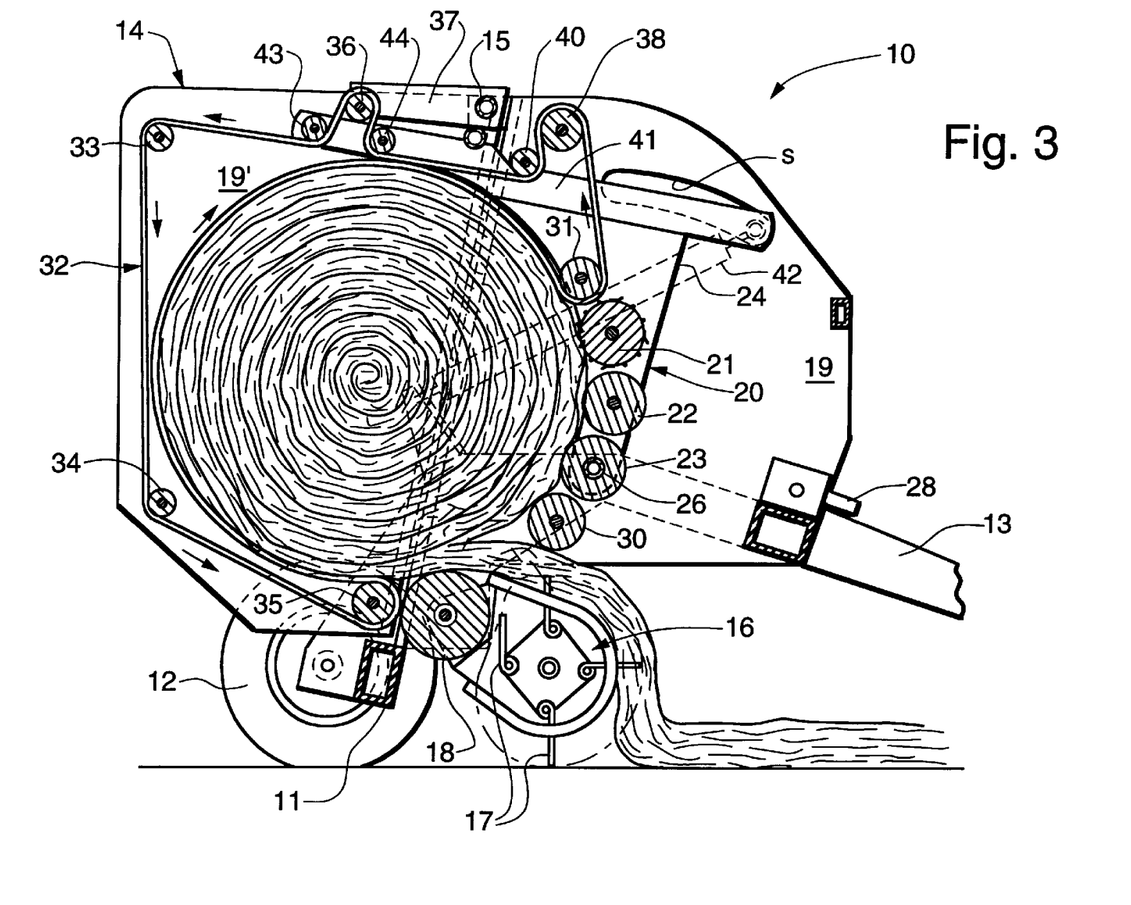
FIG. 3, also generally similar to FIG. 1, is a cross sectional diagrammatic side elevational view of a round baler in which the tailgate is in the closed position and the elements of the bale forming chamber are shown in the full bale condition.
Figure 4:
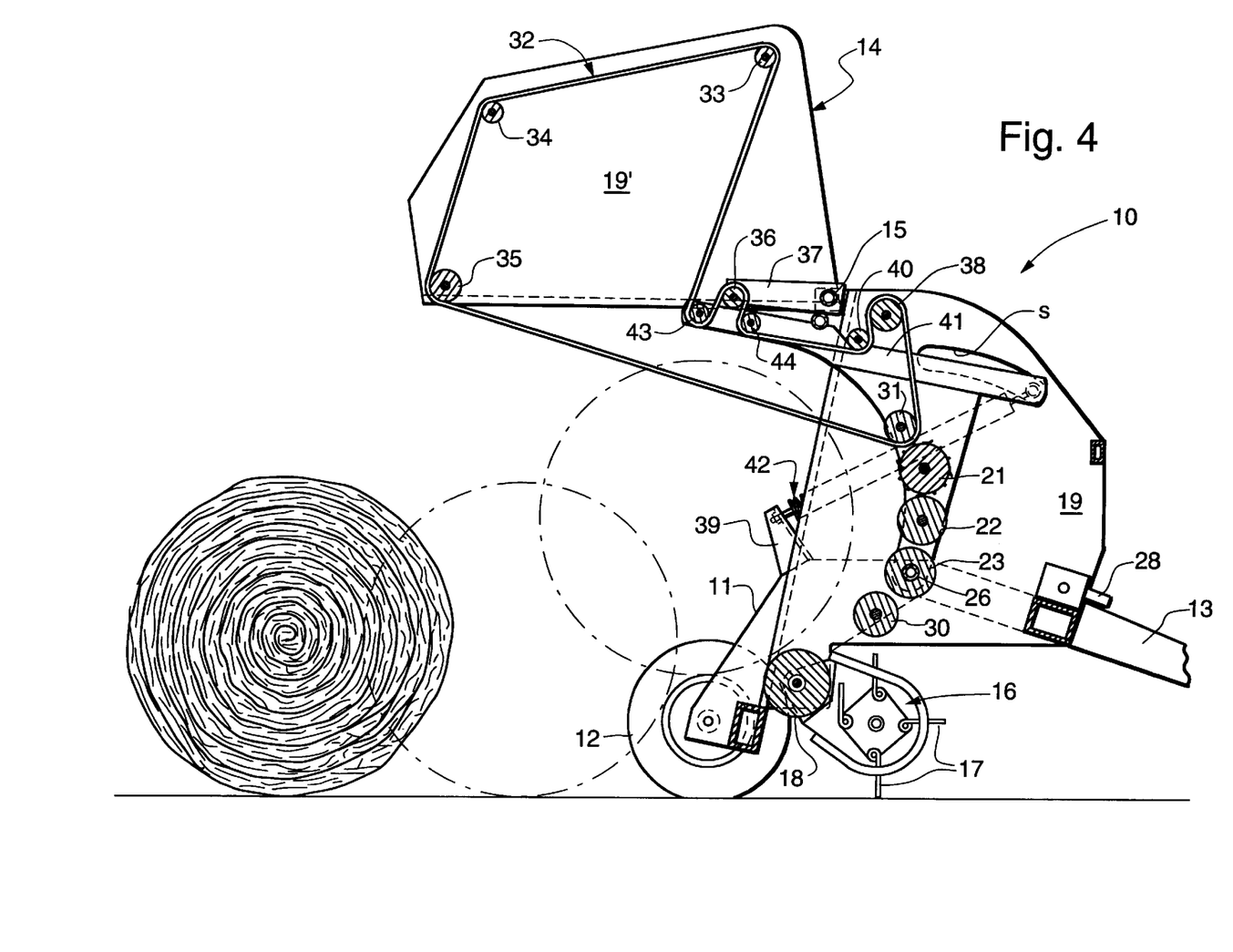
FIG. 4, also a cross sectional diagrammatic side elevational view of a round baler, shows the tailgate in the open position and the elements of the bale forming chamber after a bale has been discharged.

During bale formation, sledge assembly 20, along with the above described integral take up assembly, moves between a bale starting position (FIG. 1) to a full bale position (FIG. 3). This movement of sledge assembly 20 causes idler roll 31 to move along a generally arcuate path while maintaining apron 32 in close proximity to roll 21, thereby allowing roll 21 to strip crop material from the belts and prevent or reduce significantly the loss of crop material through the space between roll 21 and apron 32 during formation of a bale. Sledge assembly 20 is pushed outwardly towards its full bale position during bale formation as the crop material expands against rolls 21, 22, 23 and then subsequently is returned inwardly by apron 32 and spring 42 to the position shown in FIG. 1.

With the above description and general operation of baler 10 as a background, attention will now be directed to important features of the present invention. As will become apparent, baler 10 is merely illustrative of one of the many round baler configurations to which the features of the present invention are adaptable. For example, varying the number of rolls on the sledge assembly or altering the pivot location on the sledge assembly would have no affect on the general aspects of the present invention.

To further enhance understanding of the various features of the present invention, it should be noted that even though a unified sledge and take up arrangement is shown, the invention is equally adaptable to other types of round baler configurations, i.e., a round baler in which the take up arms and sledge are not integral, a round baler having no sledge assembly, etc. Thus, the many advantages realized by the present invention are not limited to a round baler with a particular bale forming chamber configuration.

Turning now to FIG. 5, a diagrammatic illustration depicts a problem to which the present invention is specifically addressed. Prior art round baler idler roll mounting assemblies commonly have paired bearings 45, 46 supported by stub shafts 47, 48 affixed by suitable means to the baler side walls 50, 51 or sledge arms, as the case may be. When radial loading occurs, illustrated by force arrows F1, F2, stub shafts 47, 48, under some circumstances, are urged slightly askew. This causes side walls 50, 51 on which the stub shafts are mounted to "oil can", i.e., deflect. The deflection, over emphasized for explanatory purposes, cocks the stub shafts on their inner races of their respective bearing assemblies, while the roll tries to keep the outer races of the bearings straight. This causes uneven loading on the bearings, illustrated by transverse force arrows T1, T2, T3, T4, leading to premature bearing failure if not corrected. The present invention, described in detail below, obviates this problem, among others.

The preferred embodiment (shown in FIGS. 6 and 7) of the present invention is depicted in a baler having a sledge assembly 20 of the type shown in FIGS. 1–4. Sledge 20, operative inwardly of wall 19, 19', consists of opposing arms 24 for supporting conveying means comprising rolls 21, 22, 23 for engaging the periphery of the cylindrical package of crop material during the bale forming operation described above, and idler roll 31 about which apron 32 (not shown in FIG. 6) is trained. As mentioned above, roll 21 is commonly referred to as a stripper roll 21, and idler roll 31 is commonly referred to as a follower roll 31. More specifically, rotatable transverse idler roll 31 is mounted, via journal means, between opposing sledge arms 24 for operatively supporting the belts of apron 32. The journal means include a bearing assembly 52 for rotatably mounting roll 31. Bearing assembly 52 includes a generally cylindrical stationary first race 53 and a concentrically disposed generally cylindrical rotatable second race 54 between which races a bearing cavity is formed for seating a series of bearings 55 housed between the first and second races in a conventional manner. The second race, seated against shoulder 56 on the inner surface of roll 31, is rotatable relative to the first race, only one of which is shown in the partial view of idler roll 31 in FIG. 6. First race 53 is attached to a shaft 57, extending between arms 24. Shaft 57 has a ribbed end portion 58, which is accommodated by groove 60 in arm 24.

Completing the journal means are a generally ring shaped stripper element 61 mounted on the facing surfaces of arms 24, washer 62, and snap ring 63, all of which are concentric with the shaft and contiguous thereto. During fabrication, stripper element 61, washer 62, and bearing assembly 52 are positioned against snap ring 63 within roll 31. This arrangement is then slid into place by guiding ribbed end portion 58 along groove 60 (FIG. 7) in arm 24, all of which is clamped into place by machine screw 64 extending through and recessed in hole in arm 24, registering with an axially disposed threaded hole in shaft 57.

Figure 8:
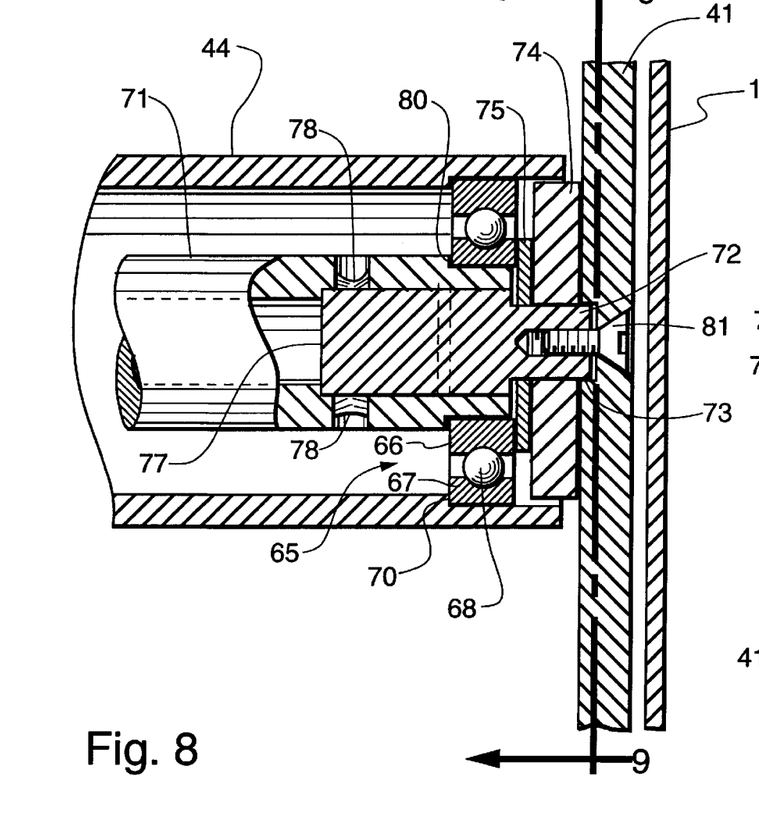
FIG. 8, a cross sectional view taken along lines 8—8 in FIG. 1, illustrates features of another embodiment of the present invention embodied in the mounting system for idler rolls mounted on the sledge assembly of the round baler shown in FIGS. 1–4.
Figure 9:
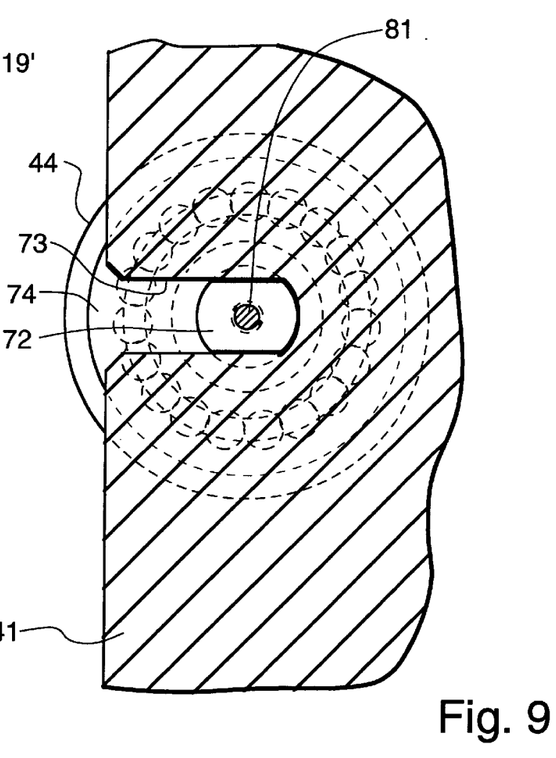
FIG. 9 is a cross sectional view taken along lines 9—9 of FIG. 8.

The embodiment shown in FIGS. 8 and 9 also depicts a baler having a sledge assembly 20 of the type shown in FIGS. 1–4. It should be noted that in this embodiment the elements used are not as heavy as those in the preceding embodiment, but to achieve this advantage the elements described below involve more machining in the fabrication process. As in the previous embodiment, sledge 20 consists of arms 24 and conveying means comprising rolls 21, 22, 23 for engaging the periphery of the cylindrical package of crop material during the bale forming operation described above, and idler roll 31 about which apron 32 is trained. As previously discussed, roll 21 is commonly referred to as a stripper roll 21, and idler roll 31 is commonly referred to as a follower roll. In this embodiment rotatable transverse idler roll 44 is mounted, via journal means, between opposing take up arms 41 for operatively supporting the belts of apron 32 inwardly of walls 19, 19'. The journal means include a bearing assembly 65 for rotatably mounting roll 44. Bearing assembly 65 includes a generally cylindrical stationary first race 66 and a concentrically disposed generally cylindrical rotatable second race 67 between which races a bearing cavity is formed for seating a series of bearings 68 housed between the first and second races in a conventional manner. The second race, seated against shoulder 70 on the inner surface of roll 44, is rotatable relative to the first race. A tubular shaft 71 extending between arms 41 has a ribbed portion 72 which is accommodated by a groove 73 in arm 41 in a manner similar to the FIG. 6 embodiment described above.

Completing the journal means are a generally ring shaped stripper element 74 mounted on the facing surfaces of arms 41, disc 75, all of which are concentric with tubular shaft 71 and contiguous thereto. A milled stub shaft 77 is welded within the inner surface of tubular shaft 71, via a series of plug welds 78. During fabrication, stripper element 74 and disc 75 are positioned against shoulder 80, machined in the outer surface of tubular shaft 71 within roll 44. This arrangement is then slid into place by guiding ribbed end portion 72 along slot 73 (FIG. 9), all of which is clamped into place by machine screw 81 extending through and recessed in a hole registering with an axially disposed threaded hole in stub shaft 77.

Figure 10:
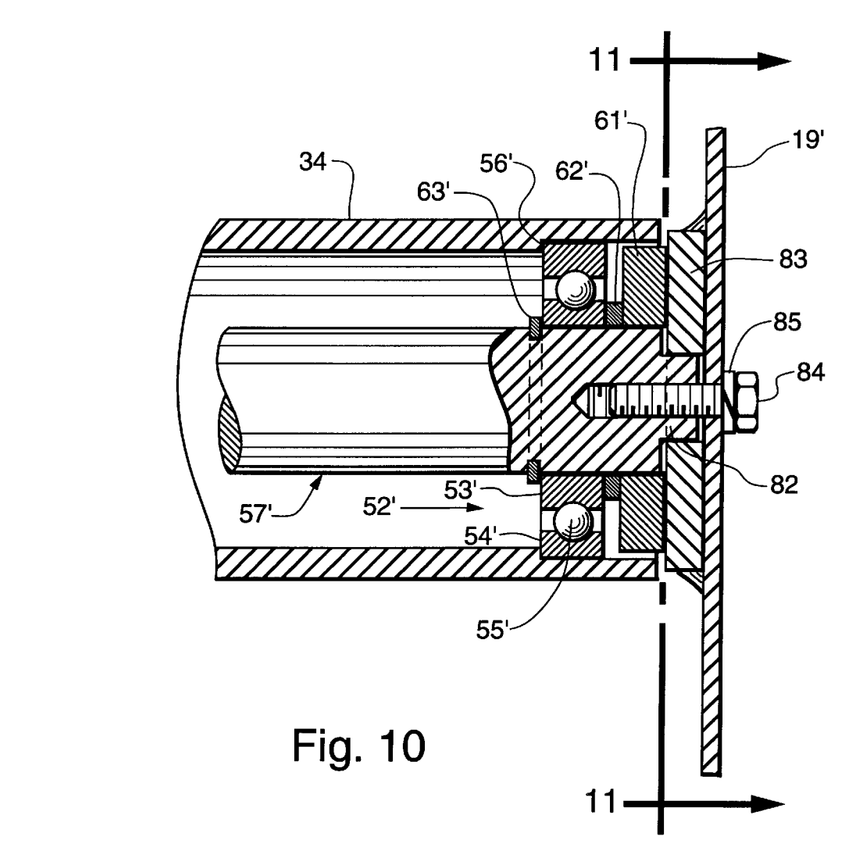
FIG. 10, a cross sectional view taken along lines 10—10 in FIG. 1, illustrates features of still another embodiment of the present invention embodied in the mounting system for idler rolls mounted on the side walls of the tailgate assembly of the round baler shown in FIGS. 1–4.
Figure 11:
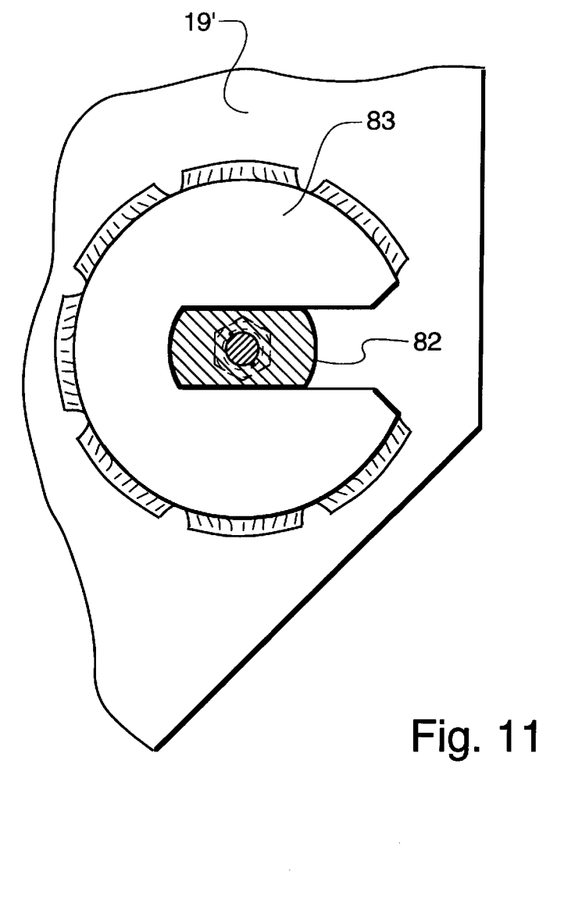
FIG. 11 is a cross sectional view taken along lines 11—11 of FIG. 10.

FIGS. 10 and 11 show a variation in the mounting arrangement of the present invention wherein the ribbed end portion 82 is mounted in a slotted ring 83 welded to the inner surface of sidewall 19'. This enables the advantages of the present invention to be realized when an idler roll, such as roll 34, is mounted between sidewalls 19', under conditions where the outer surface of the walls is readily accessible, as opposed to mounting an idler roll between the arms of a sledge assembly as depicted in the two previously described embodiments of FIGS. 6 and 7, and FIGS. 8 and 9. The sledge assembly in these embodiments is mounted entirely within the sidewalls of baler 10 and thus arms 24, 41 and the rolls mounted thereon are completely assembled on these two embodiments prior to being mounted within the sidewalls.

Figure 6:
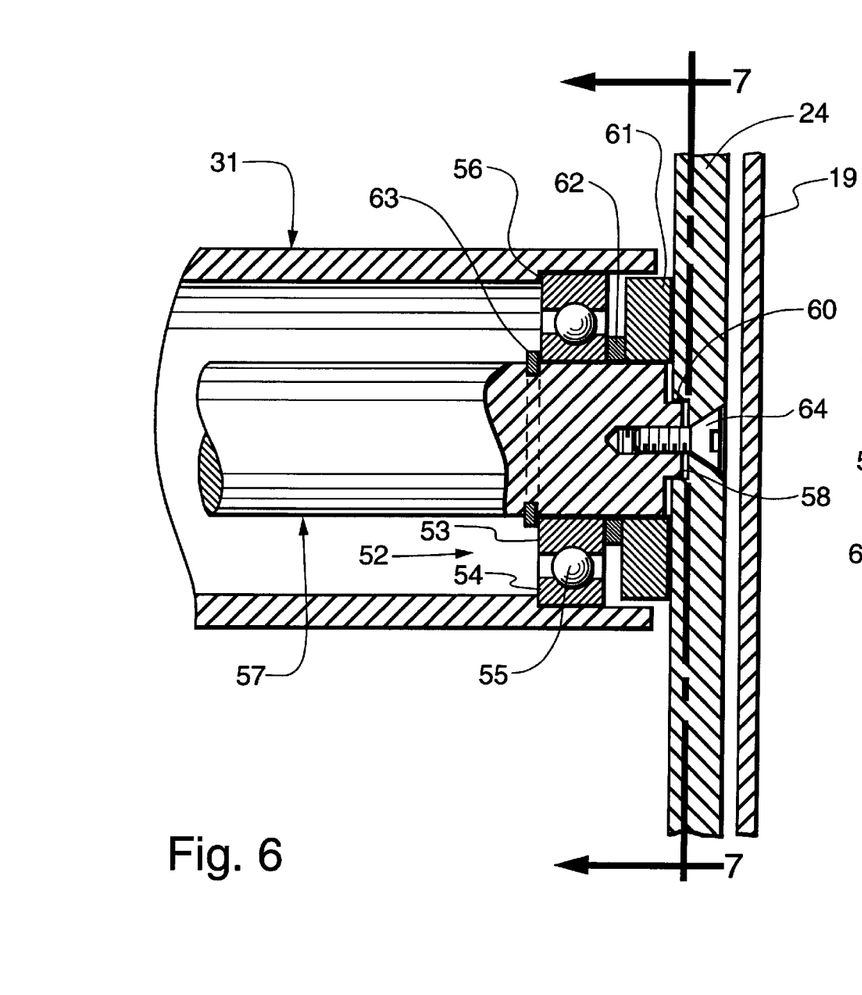
FIG. 6, a cross sectional view taken along lines 6—6 in FIG. 1, illustrates features of one embodiment of the present invention embodied in the mounting system for idler rolls mounted on the sledge assembly of the round baler shown in FIGS. 1–4.
Figure 7:
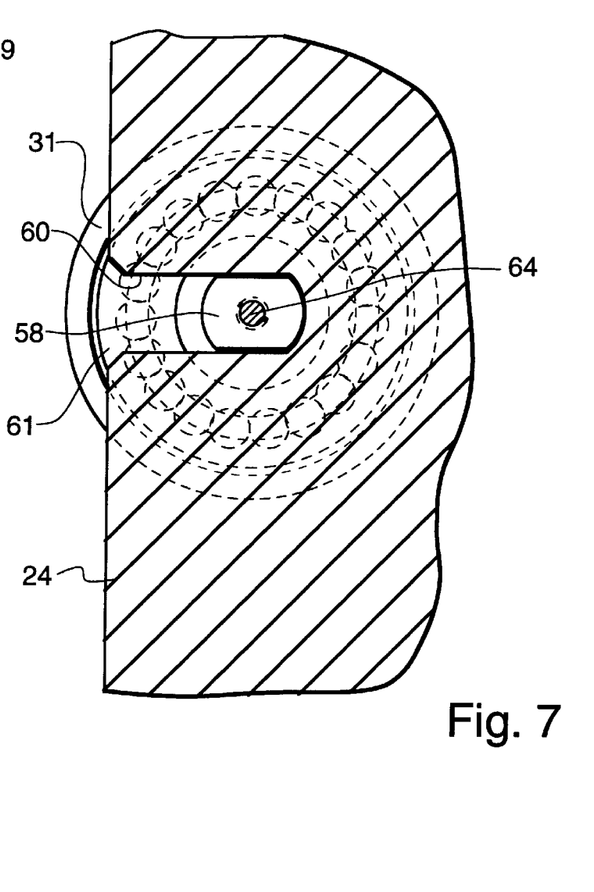
FIG. 7 is a cross sectional view taken along lines 7—7 of FIG. 6.

It should be noted that many of the elements of the FIG. 10 embodiment are similar to those of the FIG. 6 embodiment. Where similarity exists the reference numerals have been primed for convenience. Completing the FIG. 10 mounting arrangement is machine screw 84 and lock washer 85 for clamping the assembled element sin place.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a round baler having
    a pair of opposing walls having parallel surfaces facing each other at a predetermined distance,
    conveying means including an apron defining a baling chamber between said walls for forming cylindrical bales of crop material,
    a pickup for feeding crop material into said chamber,
    a tubular rotatable transverse idler roll mounted between said opposing walls for operatively supporting said apron, and
    a mounting assembly having a bearing assembly for mounting said roll on one of said opposing walls, said bearing assembly including a generally cylindrical stationary first race and a concentrically disposed generally cylindrical rotatable second race, a bearing cavity is formed between said first race and said second race for seating a series of bearings housed between said first and second races, the improvement comprising
    a shaft extending between said opposing walls, said shaft including an integral ribbed end portion, and having a length greater than said predetermined distance,
    said first race attached to said shaft,
    said second race attached to said tubular rotatable transverse idler roll,
    a slot in the parallel facing surface of said one of said opposing walls for accommodating said ribbed end portion of said shaft, and
    means for retaining said shaft in said slot.

2. In a round baler as set forth in claim 1 wherein
    said apron comprises one or more flexible moving elements, and
    said slot extends to an adjacent edge of said one of said opposing side walls.

3. In a round baler as set forth in claim 1 wherein
    said mounting assembly further comprises a second bearing assembly for mounting said roll on the other of said opposing walls, said second bearing assembly including a generally cylindrical stationary third race and a concentrically disposed generally cylindrical rotatable fourth race, a bearing cavity is formed between said third race and said fourth race for seating a series of bearings housed between said third and fourth races, the improvement further comprising
    said shaft extending between said opposing walls having a second integral ribbed portion on the other end,
    said third race, attached to said shaft,
    said fourth race attached to said tubular rotatable transverse idler roll,
    a second slot in the parallel facing surface of said other of said opposing walls for accommodating said second ribbed end portion of said shaft, and
    means for retaining said shaft in said second slot.

4. In a round baler as set forth in claim 3 wherein said second slot extends to an adjacent edge of said other of said opposing side walls said slot and said second slot are generally parallel.

5. In a round baler for forming crop material into cylindrical bales, said baler having a main frame, a pair of opposing walls having parallel surfaces facing each other at a predetermined distance, a sledge assembly mounted on said main frame for movement between a bale starting position and a full bale position, said sledge assembly including conveying means having a crop engaging surface extending transversely of said main frame, an apron supported along a continuous path on said main frame and on said sledge by a plurality of tubular rotatable transverse idler rolls, said apron path having an inner course that cooperates with said conveying means on said sledge assembly to define a bale forming chamber, drive means for moving said apron along said continuous path, said drive means including means operatively engagable with said apron, and a pickup for feeding crop material into said chamber, a mounting assembly having a bearing assembly for mounting one of said plurality of tubular rotatable transverse idler rolls on one of said opposing walls, said bearing assembly including a generally cylindrical stationary first race and a concentrically disposed generally cylindrical rotatable second race, a bearing cavity is formed between said first race and said second race for seating a series of bearings housed between said first and second races, the improvement comprising a shaft extending between said opposing walls, said shaft including an integral ribbed end portion, and having a length greater than said predetermined distance, said first race attached to said shaft, said second race attached to said at least one of said tubular rotatable transverse idler rolls, a slot in the parallel facing surface of said one of said opposing walls for accommodating said ribbed end portion of said shaft, and means for retaining said shaft in said slot.

6. In a round baler as set forth in claim 5 wherein said apron comprises one or more flexible moving elements, and said slot extends to an adjacent edge of said one of said opposing side walls.

7. In a round baler as set forth in claim 5 wherein said mounting assembly further comprises a second bearing assembly for mounting said at least one of said plurality of rolls on the other of said opposing walls, said second bearing assembly including a generally cylindrical stationary third race and a concentrically disposed generally cylindrical rotatable fourth race, a bearing cavity is formed between said third race and said fourth race for seating a series of bearings housed between said third and fourth races, the improvement further comprising said shaft extending between said opposing walls having a second integral ribbed portion on the other end, said third race attached to said shaft, said fourth race attached to said tubular rotatable transverse idler roll, a second slot in the parallel facing surface of said other of said opposing walls for accommodating said second ribbed end portion of said shaft, and means for retaining said shaft in said second slot.

8. In a round baler as set forth in claim 7 wherein said second slot extends to an adjacent edge of said other of said opposing side walls said slot and said second slot are generally parallel.

\* \* \* \* \*